United States Patent [19]

Shibata et al.

[11] 3,987,349

[45] Oct. 19, 1976

[54] CONTROL SYSTEMS OF ELECTRIC MOTORS FOR DRIVING ELECTRIC MOTOR CARS

[75] Inventors: Takanori Shibata; Katsuji Marumoto, both of Hitachi, Japan

[73] Assignee: Agency of Industrial Science & Technology, Tokyo, Japan

[22] Filed: Dec. 6, 1974

[21] Appl. No.: 530,219

[30] Foreign Application Priority Data

Dec. 10, 1973  Japan............................ 48-136726

[52] U.S. Cl................................ 318/376; 318/139; 318/440; 318/345
[51] Int. Cl.²........................................... H02M 7/52
[58] Field of Search ........... 318/139, 376, 440, 441, 318/442, 345 H, 345 D, 345 G

[56] References Cited
UNITED STATES PATENTS

| | | | |
|---|---|---|---|
| 3,387,194 | 6/1968 | Banks | 318/139 |
| 3,560,818 | 2/1971 | Amato | 318/139 X |
| 3,594,629 | 7/1971 | Kawakami et al. | 318/345 G |
| 3,619,753 | 11/1971 | Thompson | 318/345 G |
| 3,784,890 | 1/1974 | Geiersbach | 318/345 G |
| 3,893,016 | 7/1975 | Rohsler | 318/345 G |

*Primary Examiner*—B. Dobeck
*Attorney, Agent, or Firm*—Charles E. Pfund

[57] ABSTRACT

In a control system of an electric motor for driving an electric motor car of the type wherein the current supplied from a pair of batteries to the motor is controlled by a thyristor chopper, the series and parallel connections of the batteries is switched by switching means including a first thyristor connected between the batteries, a second thyristor for interconnecting the positive terminals of the batteries, and a third thyristor for interconnecting the negative terminals of the batteries. The current flowing through a powering thyristor is commutated by a commutation circuit connected across the powering thyristor and including a capacitor, a reactor and a braking thyristor.

4 Claims, 3 Drawing Figures

CONTROL SYSTEMS OF ELECTRIC MOTORS FOR DRIVING ELECTRIC MOTOR CARS

BACKGROUND OF THE INVENTION

This invention relates to a control system for a direct current motor energized from a storage battery and more particularly to a control system utilizing a thyristor chopper suitable for controlling a motor for driving an electric motor car.

A control system for controlling a direct current motor by means of a thyristor chopper is more advantageous than a conventional resistance control system in that there is no heat generation at the resistor and that it provides continuous control without using any contact. For this reason, in recent years, the field of application of this type of control system has been widened greatly and application thereof to electric motor cars has been increased. When applied to the control of an electric motor for driving an electric motor car the control system is required to provide a powering control in which the powering operation of the motor is controlled by the current chopping action of the thyristor as well as a regeneration control in which the motor is decelerated by applying thereto an electric braking by regenerating power to the source of supply from the motor. Since these modes of control are performed frequently and repeatedly it is necessary to rapidly and smoothly effect the switching of the circuit connections without using any mechanical contact. The current flowing through a direct current motor controlled by a thyristor chopper is essentially a pulsating current. However, when the frequency of the pulsating current increases, the iron loss and the eddy current loss of the motor increase which results in the decrease in the efficiency and sparking of the brushes caused by an improper commutation. This decreases the life of the brushes associated with the commutator of the motor. In order to decrease pulsation, it is necessary to include a DC smoothing reactor of large capacity in series with the motor. In an electric motor car, miniaturization and decrease in the weight of the machines and apparatus mounted thereon are essential. Moreover, such machines and apparatus are required to be highly efficient for the purpose of minimizing the power consumption of the battery. Safeness and low cost are also desired. Any of the prior art control systems could not satisfy these various requirements. For example, if one attempts to switch the powering-regeneration connections without using any contact or to increase the efficiency by decreasing the pulsation, these attempts rather complicate the circuits and increase the weight.

SUMMARY OF THE INVENTION

Accordingly, it is an object of this invention to provide an improved control system of an electric motor for driving an electric motor car capable of decreasing the number of component parts and simplifying the circuit construction.

Another object of this invention is to provide an improved control system of an electric motor capable of decreasing the number of elements which are connected in series with the motor circuit thereby improving the characteristics without decreasing the efficiency.

Still another object of this invention is to provide an improved control system of an electric motor for driving an electric motor car capable of providing an efficient powering as well as regeneration or braking operations.

According to this invention these and further objects can be accomplished by providing a control system of an electric motor for driving an electric motor car of the type wherein the current supplied to a direct current motor is controlled by a thyristor chopper, characterized in that the control system comprises a pair of batteries, switching means for switching the series and parallel connections of the batteries including a first thyristor connected between the batteries, a second thyristor for interconnecting the positive terminals of the batteries, and a third thyristor interconnecting the negative terminals of the batteries, a powering thyristor connected in series with the switching means and the electric motor; a main braking thyristor and an auxiliary braking thyristor which are connected in series across the motor; and a commutation circuit including a capacitor and a reactor, the commutation circuit being connected across the powering transistor through the main braking thyristor whereby the main braking thyristor is used as a commutation thyristor during powering and the main braking thyristor is used as a commutation thyristor during braking operations so as to use the both power thyristors as a thyristor choppers.

DESCRIPTION OF THE PREFERRED EMBODIMENTS

Figure 1:
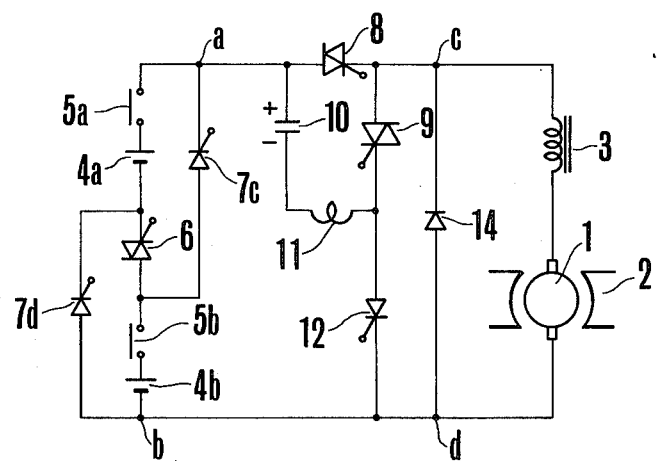
FIG. 1 shows a connection diagram of one embodiment of the control system of an electric motor for driving an electric motor car embodying the invention.

In the control system shown in FIG. 1, a direct current motor having an armature 1 and a field structure 2 is connected across serially connected batteries 4a and 4b through a smoothing reactor 3, main switches 5a and 5b and a main thyristor 8 for chopping the current flowing through the motor. For switching the batteries between series and parallel connections there is provided a thyristor 6, and thyristors 7c and 7d are used to connect the switches in parallel. For commutating the main thyristor 8, a commutating thyristor 9 which is also used for regeneration, a commutating capacitor 10 and a reactor 11 which are connected in series. There are also provided a regeneration or braking thyristor 12 connected in series with the thyristor 9, said series connection being parallel to the armature 1 and a flywheel diode 14 connected in parallel with the armature 1.

During powering, the circuit described above operates as follows. At this time the main switches 5a and 5b are closed and the thyristors 6 and 12 are ignited simultaneously for charging the commutation capacitor 10. Then the charging current of the commutation capacitor 10 flows through a circuit that can be traced from terminal a through capacitor 10, reactor 11, and thyristor 12 to terminal b, thus charging capacitor 10 to the polarity as shown in FIG. 1.

When the charging of the capacitor 10 is completed, thyristor 6 and 12 turn OFF automatically. For operating the DC motor at low speeds, thyristors 7c, and 7d and 8 are ignited. Then the batteries 4a and 4b are connected in parallel so that the low terminal voltage of the batteries appears across terminals a and b and the terminals c and d of the motor. Thus, the motor is operated under a low voltage condition. To stop the motor, thyristor 9 is rendered ON for rendering OFF the main thyristor 8 by the oscillating current created by the commutating capacitor 10 and reactor 11. When the main thyristor 8 turns OFF, thyristors 7a and 7d are also turned OFF simultaneously. Then, the current of the motor flows through the flywheel diode 14. For operating the motor at high speeds, thyristor 6 is rendered ON together with main thyristor 8. Then two batteries are connected in series to apply a high voltage to the motor.

For regeneration or braking, after charging the commutation capacitor 10 by simultaneously turning ON thyristors 6 and 12, thyristors 9 and 12 are turned ON simultaneously to pass current through these thyristors 9 and 12 and through the reactor 3 by the back electromotive force of the motor. Then the main thyristor 8 is turned ON to turn OFF the thyristor 9 by the oscillating current created by the commutating capacitor 10 and reactor 11. When the thyristor 9 is turned OFF, thyristor 12 turns OFF automatically so that the voltage induced across the reactor 3 is superposed upon the back electromotive force of the motor and the batteries are charged by the regenerated current caused by sum voltage and flows through thyristors 8 and 6, thus applying a regeneration braking to the motor. For passing current in both directions each of thyristors 8 and 6 must comprise a pair of oppositely poled thyristors or a combination of a thyristor and a diode which are connected in parallel opposition.

When establishing a regeneration or braking circuit the source would not be short circuited because thyristors 6, 7c and 7d are maintained OFF when the thyristors 9 and 12 are turned OFF by turning ON thyristor 8.

Figure 2:
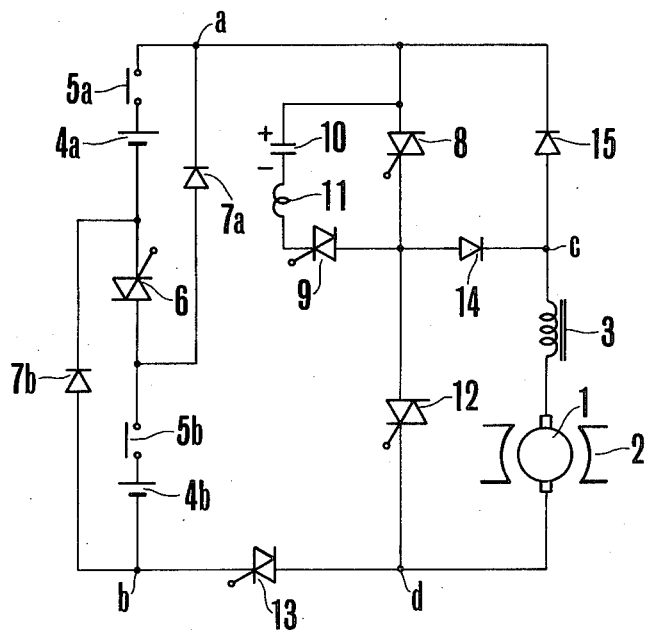
FIG. 2 shows a connection diagram of one example of the prior art control system of an electric motor for driving an electric motor car and FIG. 3 shows a partial connection diagram of a modified embodiment of this invention.

To make clear the improvement and advantage of this invention, a typical prior art circuit will be described briefly with reference to FIg. 2. More particularly, the switching of the series and parallel connections of the batteries has been performed by diodes 7a and 7b. Consequently, there was a fear of short circuiting the batteries when the thyristors 8 and 12 are turned ON for applying braking to the motor, so that a thyristor 13 was connected between terminals b and d. Moreover, a diode 15 was necessary for passing regeneration current.

With this connection, during powering a number of elements such as thyristor 6 (or diodes 7a and 7b), thyristor 8, diode 14 and thyristor 13 are included in series with the motor circuit, whereas during regeneration, diode 15, thyristors 8 and 12 or diode 15 and thyristors 6 and 13 are connected in series. Thus, the losses in these elements causes a large power loss thus decreasing the efficiency of the system.

As it is necessary to use a large number of component elements, it is impossible not only to decrease the physical size, weight and cost of the control system but also to increase the reliability thereof.

In contrast, according to this invention the number of component elements included in the motor circuit can be reduced both during powering and regeneration, thus eliminating above described defects of the prior art control system.

Figure 3:
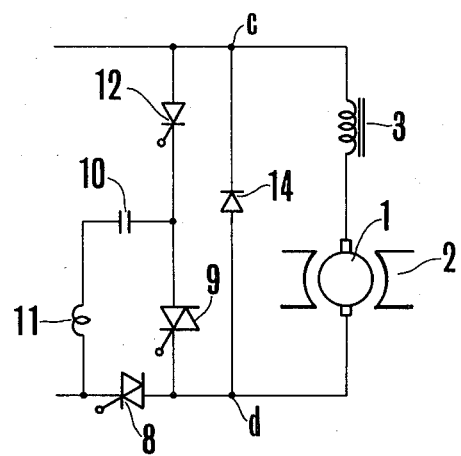

FIG. 3 shows a portion of a modified embodiment of this invention in which the main thyristor 8 is connected between the armature 1 and the negative pole of the batteries and a commutation circuit including capacitor 10 and reactor 11 are connected across the main thyristor 8 through a thyristor 19. The operation of this modification is identical to that of the first embodiment.

Although the invention has been shown and described in terms of some preferred embodiments it should be understood that many changes and modifications can be made without departing from the true spirit and scope of the invention as defined in the appended claims. For example, there is no limit on the number of the batteries.

What is claimed is:

1. A control system of an electric motor for driving an electric motor car, comprising a pair of batteries, switching means for switching the series and parallel connections of said batteries including a first thyristor connected between said batteries, a second thyristor for interconnecting the positive terminals of said batteries, and a third thyristor interconnecting the negative terminals of said batteries; a bidirectional powering thyristor connected in series with said switching means and said electric motor; a flywheel diode connected in parallel with said motor, a bidirectional main braking thyristor and an auxiliary braking thyristor connected in series, said series connections being parallel to said motor; and a commutation circuit including a capacitor and reactor, said commutation circuit being connected across said bidirectional powering thyristor through said bidirectional main braking thyristor whereby said bidirectional main braking thyristor is used as a commutation thyristor during powering operations and said main powering thyristor is used as a commutation thyristor during regeneration and braking operations so as to use said bidirectional powering thyristor as a thyristor chopper.

2. The control system according to claim 1 wherein said powering thyristor is connected between the positive poles of the batteries and said motor and said commutation circuit is connected between the anode electrode of said powering thyristor and the cathode electrode of said main braking thyristor.

3. The control system according to claim 1 wherein said first thyristor is connected between the negative pole of one battery and the positive pole of the other battery through a first switch, the positive pole of said one battery is connected to the positive terminal of the source through a second switch, said second thyristor is connected between the anode electrode of said first thyristor and said positive terminal, and said third thyristor is connected between the cathode electrode of said first thyristor and the negative terminal of the source.

4. The control circuit according to claim 1 which further comprises a reactor connected between said powering thyristor and said motor.

* * * * *